United States Patent
Kim et al.

(10) Patent No.: US 9,036,549 B2
(45) Date of Patent: May 19, 2015

(54) METHOD AND DEVICE FOR INDICATING WHETHER TERMINAL CARRIER AGGREGATION HAS BEEN ACTIVATED IN A CELLULAR WIRELESS COMMUNICATION SYSTEM

(75) Inventors: Young-Bum Kim, Seoul (KR); Joon-Young Cho, Suwon-si (KR); Youn-Sun Kim, Seongnam-si (KR); Jin-Kyu Han, Seoul (KR); Seung-Hoon Choi, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 471 days.

(21) Appl. No.: 13/499,897

(22) PCT Filed: Sep. 30, 2010

(86) PCT No.: PCT/KR2010/006687
§ 371 (c)(1),
(2), (4) Date: Jun. 25, 2012

(87) PCT Pub. No.: WO2011/040777
PCT Pub. Date: Apr. 7, 2011

(65) Prior Publication Data
US 2012/0250625 A1    Oct. 4, 2012

(30) Foreign Application Priority Data
Oct. 1, 2009    (KR) .................. 10-2009-0093978

(51) Int. Cl.
*H04W 4/00* (2009.01)
*H04L 5/00* (2006.01)

(52) U.S. Cl.
CPC .............. *H04L 5/0096* (2013.01); *H04L 5/001* (2013.01); *H04L 5/0053* (2013.01); *H04L 5/0098* (2013.01); *Y02B 60/50* (2013.01)

(58) Field of Classification Search
None
See application file for complete search history.

(56) References Cited

U.S. PATENT DOCUMENTS

| 2002/0127982 A1* | 9/2002 | Haapoja et al. ............... 455/130 |
| 2007/0097920 A1* | 5/2007 | Chen et al. .................... 370/331 |
| 2011/0116467 A1* | 5/2011 | Jung et al. ..................... 370/329 |

OTHER PUBLICATIONS

International Search Report dated May 27, 2011 in connection with International Patent Application No. PCT/KR2010/006687.
Written Opinion of International Searching Authority dated May 27, 2011 in connection with International Patent Application No. PCT/KR2010/006687.
R1-093465, "Component Carrier Indication Scheme For Carrier Aggregation", 3GPP TSG-RAN WG1 Meeting #58, Aug. 24-28, 2009, pp. 1-3.
R1-093372, "Carrier Indication in PDCCH", 3GPP TSG-RAN WG1 Meeting #58, Aug. 24-28, 2009, pp. 1-4.
R1-092061, "Notion of Anchor Carrier in LTE-A", 3GPP TSG-RAN WG1 Meeting #57, May 4-8, 2009, pp. 1-5.
R1-094568, "Configuration of Carrier Indicator Information Element", 3GPP TSG-RAN WG1 Meeting #59, Nov. 9-13, 2009, pp. 1-4.

* cited by examiner

*Primary Examiner* — Minh-Trang Nguyen

(57) ABSTRACT

A method and device deactivate carrier aggregation and execute single carrier operation in a terminal, in a wireless communication system in which broadband is achieved by means of carrier aggregation. More specifically, in a terminal which is running a plurality of carriers, unnecessary power consumption in the terminal is prevented and additional screening events are minimized by defining physical layer signaling so as to make the terminal rapidly convert to running a single carrier.

22 Claims, 14 Drawing Sheets

METHOD AND DEVICE FOR INDICATING WHETHER TERMINAL CARRIER AGGREGATION HAS BEEN ACTIVATED IN A CELLULAR WIRELESS COMMUNICATION SYSTEM

CROSS-REFERENCE TO RELATED APPLICATION(S)

The present application claims priority under 35 U.S.C. §365 to International Patent Application No. PCT/KR2010/006687 filed Sep. 30, 2010, entitled "METHOD AND DEVICE FOR INDICATING WHETHER TERMINAL CARRIER AGGREGATION HAS BEEN ACTIVATED IN A CELLULAR WIRELESS COMMUNICATION SYSTEM". International Patent Application No. PCT/KR2010/006687 claims priority under 35 U.S.C. §365 and/or 35 U.S.C. §119(a) to Korean Patent Application No. 10-2009-0093978 filed Oct. 1, 2009, and which are incorporated herein by reference into the present disclosure as if fully set forth herein.

BACKGROUND OF THE INVENTION

1. Field of the Invention

This invention relates to cellular wireless communication systems, and more particularly, to a device and method for indicating whether user equipment carrier aggregation has been activated in a system for supporting carrier aggregation.

2. Description of the Related Art

Mobile communication systems have recently developed to achieve high data rate transmission via wireless channels, such as Orthogonal Frequency Division Multiple Access (OFDMA) or a Single Carrier Frequency Division Multiple Access (SC-FDMA). Multiple access is achieved by assigning or managing time-frequency resources that carry data or control information, to individual users, so that the resources cannot be superimposed, or by achieving orthogonality, thereby indentifying the data or control information respectively.

In order to provide high rate wireless data service in cellular wireless communication systems, one important factor is the ability to support scalable bandwidth. For example, Long Term Evolution (LTE) systems can support various bandwidths, such as 20, 15, 10, 5, 3, 1.4 MHz, etc. Service providers can select corresponding bandwidths to provide their services. There are various types of user equipment that can support bandwidths from 20 MHz to 1.4 MHz. LTE-Advanced (LTE-A) systems, intending to accommodate a service level of IMT-Advanced requirements, can provide a wide range of bandwidth, up to 100 MHz, via LTE carrier aggregation.

In order to achieve high rate data transmission, LTE-A systems require a wider range of bandwidth than LTE systems. Considering the backward compatability with LTE user equipment, LTE-A systems may also allow for the access of LTE user equipment and the usage of services. High rate data transmission can be achieved in LTE-A systems in such a way that: the entire system bandwidth is divided into component carriers (CC) or sub-bands of a bandwidth through which LTE user equipment can transmit or receive data; the component carriers are aggregated; data is created and transmitted, with respect to the respective component carriers; and transmission-reception processes of LTE systems are used with respect to the respective component carriers.

FIG. 1 illustrates an example of a configuration of an LTE-A system where the uplink and downlink each has three component carriers. For example, a reference of the aggregated component carriers is called an anchor carrier or anchor component carrier, and the others are called a non-anchor carrier or non-anchor component carrier. An eNode B or base station (BS) notifies user equipment (UE) of which one of the component carriers is set and managed as an anchor carrier, by performing an upper layer signaling operation. In general, it is assumed that the number of component carriers to be aggregated is set via an upper layer signaling operation. In downlink, a component carrier set as an anchor carrier may be a reference component carrier that transmits the initial system information, performs an upper layer signaling operation, and controls user equipment mobility. Likewise, in uplink, a component carrier, performing a random access operation after user equipment first accesses a system, may be an uplink anchor carrier.

As shown in FIG. 1, downlink and uplink are each operated via three aggregated component carriers, where a downlink component carrier, Downlink CC (DL CC) #0, and an uplink component carrier, Uplink CC (UL CC) #0, are set as anchor carriers of uplink and downlink, respectively. FIG. 1 shows an example of symmetrical carrier aggregation where the number of uplink component carriers is the same as the downlink component carriers; however, they can also be achieved with asymmetrical carrier aggregation where their numbers differ from each other.

As described above, LTE-A systems create and transmit data according to respective component carriers. Scheduling information regarding the transmitted data is Downlink Control Information (DCI) and reported to user equipment. DCI defines a variety of formats, and a format is determined according to whether it is scheduling information regarding uplink data or downlink data, whether it is compact DCI, whether spatial multiplexing using multiple antennas is applied, whether it is power controlling DCI, etc. For example, DCI format 1, regarding downlink data, without Multiple Input Multiple Output (MIMO), may include the following control information.

Resource allocation type 0/1 flag: report resource allocation type 0 or 1. Type 0 refers to a mode where resources are allocated, in units of resource block group (RBG), using bit-maps. The basic unit of scheduling in LTE and LET-A systems is resource block (RB) represented by time and frequency domains. An RBG includes a number of RBs and serves as the basic unit of scheduling in type 0. Type 1 refers to a mode where an RB is assigned in an RBG.

Resource block assignment: report RB allotted to data transmission. Resources, represented according to system bandwidth and resource allocation method, are determined.

Modulation and coding scheme: report coding rate and modulation used for data transmission.

HARQ process number: report HARQ process number.

New data indicator: report initial transmission or re-transmission of HARQ.

Redundancy version: report redundancy version of HARQ.

TPC command for Physical Uplink Control CHannel (PUCCH): report power control command for PUCCH as uplink control channel.

The DCI is processed through channel coding and modulation, and then transmitted via Physical Downlink Control Channel (PDCCH) as a downlink physical control channel.

FIG. 2 illustrates an example where a base station schedules downlink data to user equipment in an LTE-A system where two carriers, DL CC #1 and DL CC #2, are aggregated. DCI 201 is transmitted via downlink component carrier #1

(DL CC #1) 209. DCI 201 is formatted, complying with the definition of LTE, channel-coded, and interleaved, thereby forming PDCCH 203. PDCCH 203 informs user equipment of scheduling information regarding Physical Downlink Shared Channel (PDSCH) 213 as a data channel allocated to user equipment, via DL CC#1 (209). DCI 205 is transmitted via downlink component carrier #2 (DL CC #2) 211. DCI 205 is formatted, complying with the definition of LTE, channel-coded, and interleaved, thereby forming PDCCH 207, PDCCH 207 informs user equipment of scheduling information regarding PDCCH 215 as a data channel allocated to user equipment, via DL CC#2 (211).

When user equipment is activated by the aggregation of N component carriers in LET-A system described above, if it does not receive the notification although real data is scheduled regarding only one component carrier, it must receive control channels with respect to respective component carriers in order to determine whether the N−1 component carriers are scheduled. This causes user equipment to consume electric power.

SUMMARY OF THE INVENTION

The invention has been made in view of the above problems, and provides a system and method that can allow user equipment to deactivate the carrier aggregation in a wireless communication system that supports a wide range of bandwidth via carrier aggregation.

In accordance with an exemplary embodiment of the invention, the invention provides a transmission method of a base station in a mobile communication system supporting carrier aggregation, including: activating multi-carriers where a number of component carriers forming a first set are aggregated, when operating in a multi-carrier mode, and transmitting a control signal and data via the multi-carriers; activating, when the multi-carrier mode is switched to a single carrier mode, one of a number of component carriers forming a second set, deactivating the remaining component carriers in the second set, and transmitting data and a control signal with a preset carrier indicator via the single carrier; and notifying, when the single carrier mode is switched to the multi-carrier mode, user equipment of the multi-carrier mode.

In accordance with another exemplary embodiment of the invention, the invention provides a reception method of user equipment in a mobile communication system supporting carrier aggregation, including: receiving, when operating in a multi-carrier mode, data and a control signal related to multi-carriers where a number of component carriers forming a first set are aggregated, via the multi-carriers; and switching, when a control signal with a preset carrier indicator is received via one of a number of other component carriers forming a second set during the multi-carrier mode, the multi-carrier mode to a single carrier mode and receiving data via the single carrier.

In accordance with another exemplary embodiment of the invention, the invention provides a transmission device of a base station in a mobile communication system supporting carrier aggregation, the device including: a controller and a scheduler. The controller activates multi-carriers where a number of component carriers forming a first set are aggregated, when operating in a multi-carrier mode. The controller activates, when the multi-carrier mode is switched to a single carrier mode, one of a number of component carriers forming a second set. The controller deactivates the remaining component carriers in the second set. The scheduler transmits data and a control signal via the multi-carrier, during the multi-carrier mode, and data and a control signal with a preset carrier indicator via the single carrier, during the single carrier mode. The scheduler notifies, when the single carrier mode is switched to the multi-carrier mode, user equipment of the multi-carrier mode.

In accordance with another exemplary embodiment of the invention, the invention provides a reception device of user equipment in a mobile communication system supporting carrier aggregation, the device including a receiver and a carrier aggregation controller. The receiver receives data and a control signal related to multi-carriers where a number of component carriers forming a first set are aggregated, via the multi-carriers, when operating in a multi-carrier mode, and data and a control signal via one of a number of component carriers forming a second set, when operating in a single carrier mode. The carrier aggregation controller switches, when a control signal with a preset carrier indicator is received via the single carrier during the multi-carrier mode, the multi-carrier mode to a single carrier mode. The carrier aggregation controller executes, when receiving a notification of the mode switching operation, the multi-carrier mode.

BRIEF DESCRIPTION OF THE DRAWINGS

The features and advantages of the invention will become more apparent from the following detailed description in conjunction with the accompanying drawings, in which.

DETAILED DESCRIPTION OF EXEMPLARY EMBODIMENTS

Figure 1:
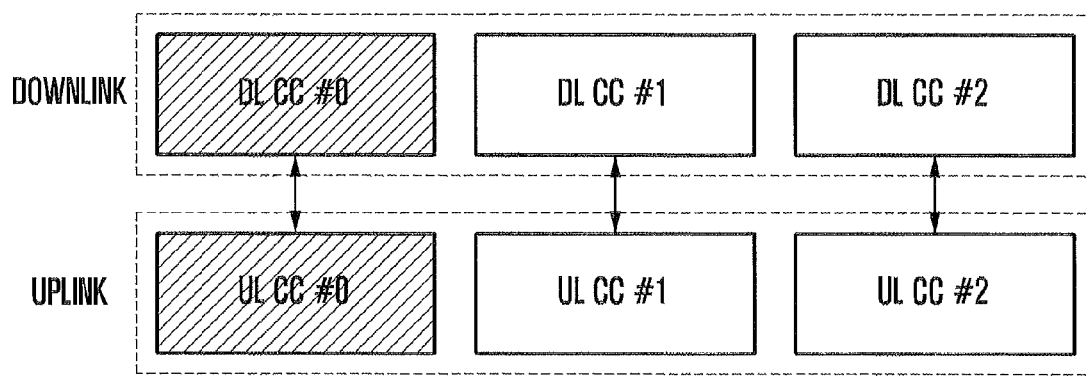
FIG. 1 illustrates an example of carrier aggregation in an LTE-A system.

Hereinafter, exemplary embodiments of the invention are described in detail with reference to the accompanying drawings, Detailed descriptions of well-known functions and structures incorporated herein may be omitted to avoid obscuring the subject matter of the invention. The terms or words described in this description and the claims should not be limited by a general or lexical meaning, instead should be analyzed as a meaning and a concept through which the inventor defines and describes the invention at his most effort, to comply with the idea of the invention. Therefore, one skilled in the art will understand that the embodiments disclosed in the description and configurations illustrated in the drawings are only preferred embodiments, instead there may be various modifications, alterations, and equivalents thereof to replace the embodiments at the time of filing this application.

Although the following embodiments will be described based on Advanced E-UTRA (or LTE-A) systems that support carrier aggregation, it should be understood that the invention is not limited to the embodiments. That is, the invention can also be applied to various types of communications that support channels similar to the idea of the invention, for example, multicarrier HSPA.

The invention provides a system and method that rapidly enables user equipment to perform a transmission/reception operation regarding one single preset carrier, which is hereinafter called 'single component carrier fallback,' where the user equipment has been activated by setting the multi-carriers, in a wireless communication system that supports a wide range of bandwidth via carrier aggregation. In particular, the system and method according to the invention can perform the single component carrier fallback with a high level of reliability and without additional uplink feedback overhead, thereby minimizing electric power consumption in the user equipment. Multiple carriers each include a number of component carriers that are aggregated. In single component carrier fallback, one of the preset component carriers is called an anchor carrier or anchor component carrier. An anchor carrier is processed according to a predefined protocol between a base station and user equipment. The other component carriers are called non-anchor carriers or non-anchor component carriers. Single component carrier fallback refers to an operation where transmission/reception is performed via the anchor carrier and is stopped via non-anchor carriers.

Figure 2:
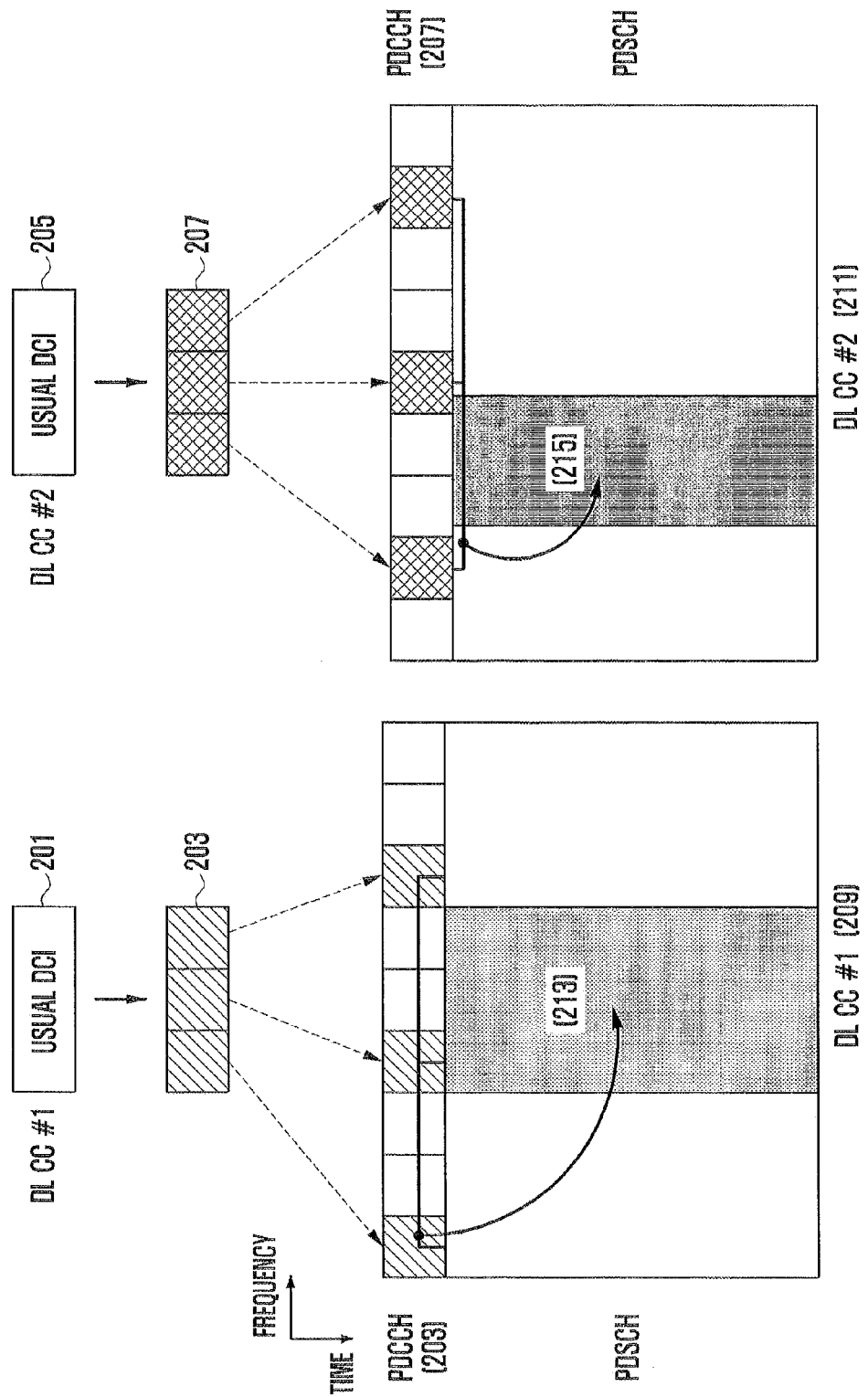
FIG. 2 illustrates an example where a base station schedules downlink data to user equipment in an LTE-A system supporting carrier aggregation.

In an LTE-A systems supporting carrier aggregation, data transmission and DCI transmission for supporting data transmission is performed according to corresponding component carriers, as shown in FIG. 2. However, in order to achieve highly reliable reception performance in user equipment, DCI may be transmitted via component carriers for transmitting data and the other component carriers. This is described referring to FIG. 3.

Figure 3:
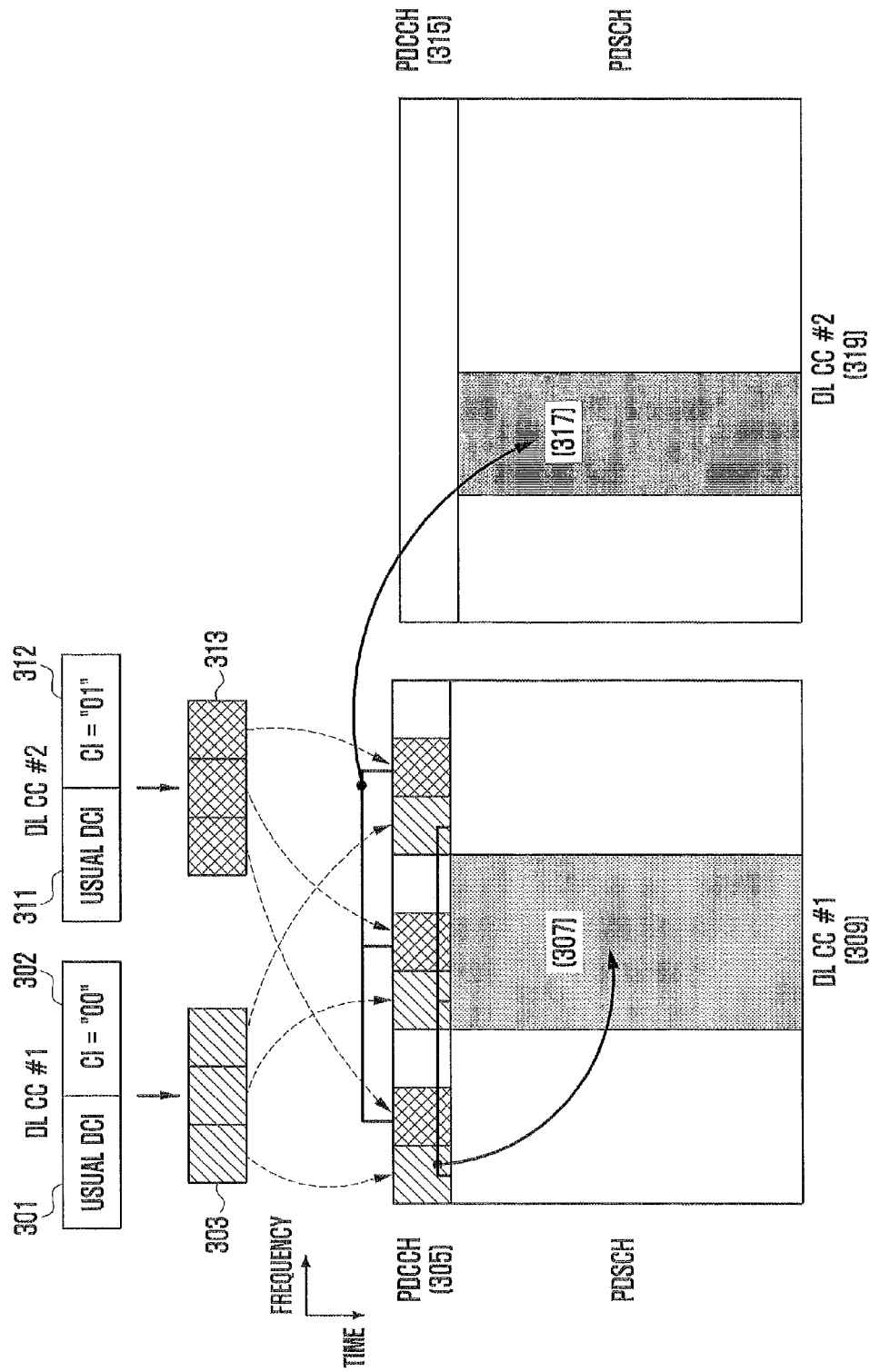
FIG. 3 illustrates an example where an LTE-A system performs a scheduling operation using a carrier indicator.

FIG. 3 shows an example where a scheduling operation is performed in LTE-A user equipment that aggregates downlink component carrier #1 (DL CC #1) 309 and downlink component carrier #2 (DL CC #2) 319. Since downlink interference occurs in DL CC #2 (319) more often than in DL CC #1 (309), if DCI for data transmission is transmitted via DL CC #2 (319), it is difficult to achieve a certain level of DCI reception performance. In that case, the base station can transmit DCI via DL CC #1 (309). Since data errors can be corrected via HARQ re-transmission, data can be transmitted via DL CC #2 (319). To do this, the base station adds a carrier indicator (CI), indicating that DCI represents scheduling information regarding a component carrier, to DCI that represents the resource allocation information regarding scheduled data, the transmission format, etc. For example, CI='00' means that it is scheduling information regarding DL CC #1 (309).

Therefore, DCI 301, representing the resource allocation information regarding scheduled data 307 to DL CC #1 (309), and the transmission format, is coupled with a carrier indicator 302, thereby creating extended DCI. The DCI is channel-coded (303). The channel coded DCI 303 is processed to form PDCCH by a modulation process and an interleaving process. After that, it is mapped to the PDCCH area 305 of DL CC #1 (309) and then transmitted. DCI 311, representing the resource allocation information regarding scheduled data 317 to DL CC #2 (319), and the transmission format, is coupled with a carrier indicator 312, thereby creating extended DCI. The DCI is channel-coded (313). The channel coded DCI 313 is processed to form PDCCH by a modulation process and an interleaving process. After that, it is mapped to the PDCCH area 305 of DL CC #1 (309) and then transmitted.

In order to support a single component carrier fallback where user equipment activating multi-carriers deactivates the aggregation of multi-carriers and receives data via only the anchor carrier, a specific codeword of the carrier indicator is defined to report the 'single component carrier fallback.' That is, the carrier indicator allows user equipment to receive data via the anchor carrier of multi-carriers and to stop receiving data at the non-anchor carriers. For example, CI="all one" is defined for reporting the 'single component carrier fallback.' Alternatively, the control information to report a 'single component carrier fallback' may be defined separately from the carrier indicator. This is described referring to FIG. 4.

Figure 4:
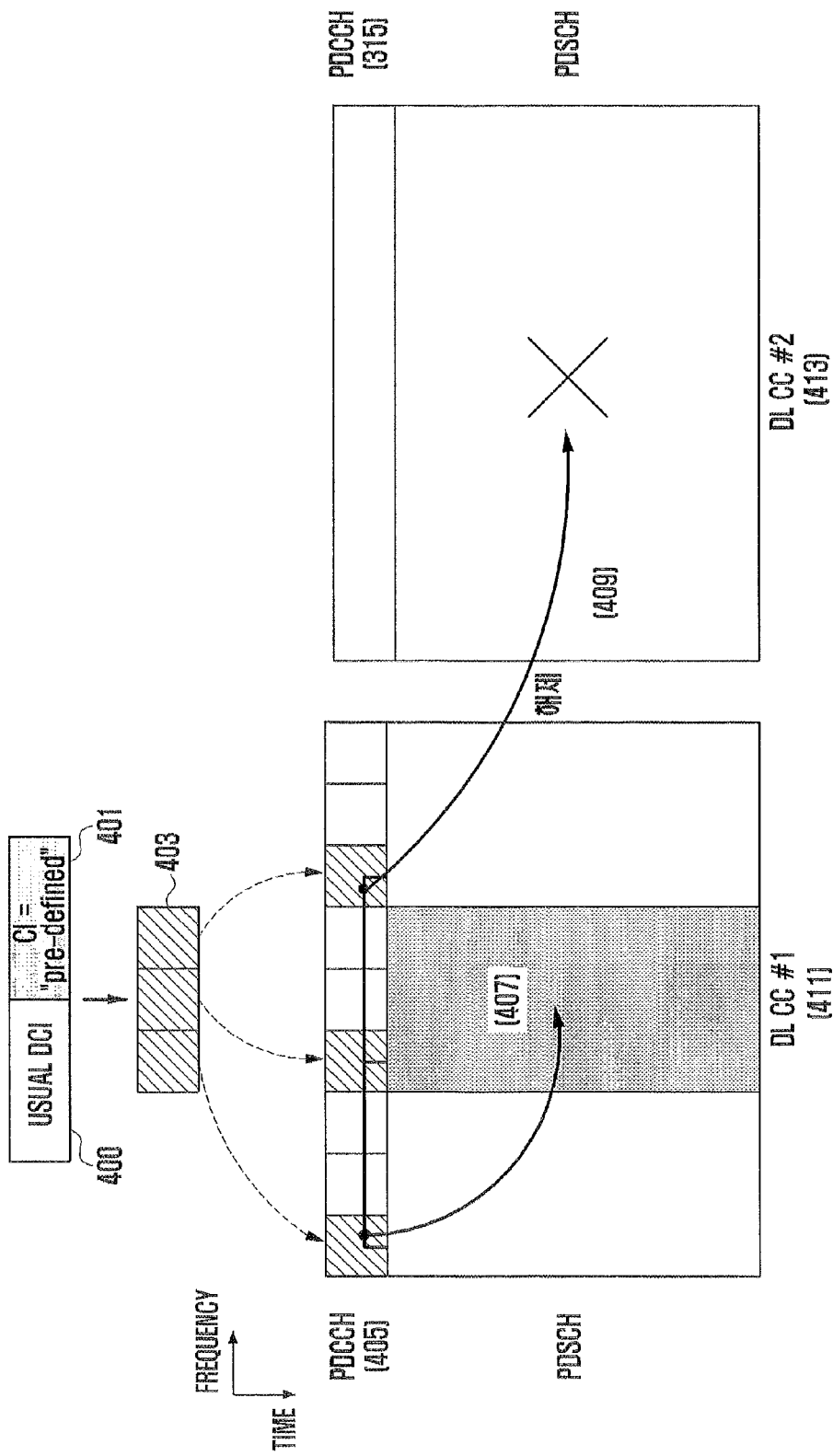
FIG. 4 illustrates an example where an LTE-A system performs a single component carrier fallback.

FIG. 4 shows an example where user equipment, where DL CC #1 (411) and DL CC #2 (413) are activated, performs a 'single component carrier fallback' via a carrier indicator and DCI of the DL CC #1 (411). The base station instructs the single component carrier fallback in various states according to the determination of the scheduler. Examples of the states are a case where the base station does not have sufficient data to be transmitted to user equipment or available system resources. Base station couples DCI 400 and CI="all one" 401 and creates extended DCI. Base station channel-codes (403), modulates and interleaves the extended DCI, thereby configuring PDCCH. After that, base station maps the PDCCH to the PDCCH area 405 of the DL CC #1 (411) and transmits it. DCI 400 indicates scheduling information regarding data 407 of DL CC #1. CI="all one" 401 indicates the deactivation regarding the remaining component carriers other than the DL CC #1 serving as an anchor carrier. When user equipment successfully received PDCCH, it stops performing the PDCCH reception regarding non-anchor carriers, and thus reduces electric power consumption.

As described above, the invention can be applied to the number of component carriers forming a wide bandwidth, via carrier aggregation. In the following description, a system and method for switching an operation to a single carrier mode according to a single component carrier fallback command is explained. A multi-carrier mode refers to a transmission/reception operation via multi-carriers where a number of component carriers are aggregated. A single carrier mode refers to a transmission/reception operation via one of the components, i.e., an anchor carrier. Each component carrier includes a control channel and a data channel. The reception operation includes a control reception operation for the control channel and a data reception operation for the data channel.

Embodiment 1

In embodiment 1, user equipment where multi-carriers are activated performs the deactivation via a 'single component carrier fallback' command and performs a single carrier mode, in an LTE-A system supporting carrier aggregation. User equipment performs downlink control information via extended DCI that always includes CI, regardless of whether user equipment performs a multi-carrier mode or a single carrier mode. Embodiment 1 has a feature that does not require, from the user equipment, a feedback indicating whether the user equipment has successfully received a 'single component carrier fallback.'

Figure 5:
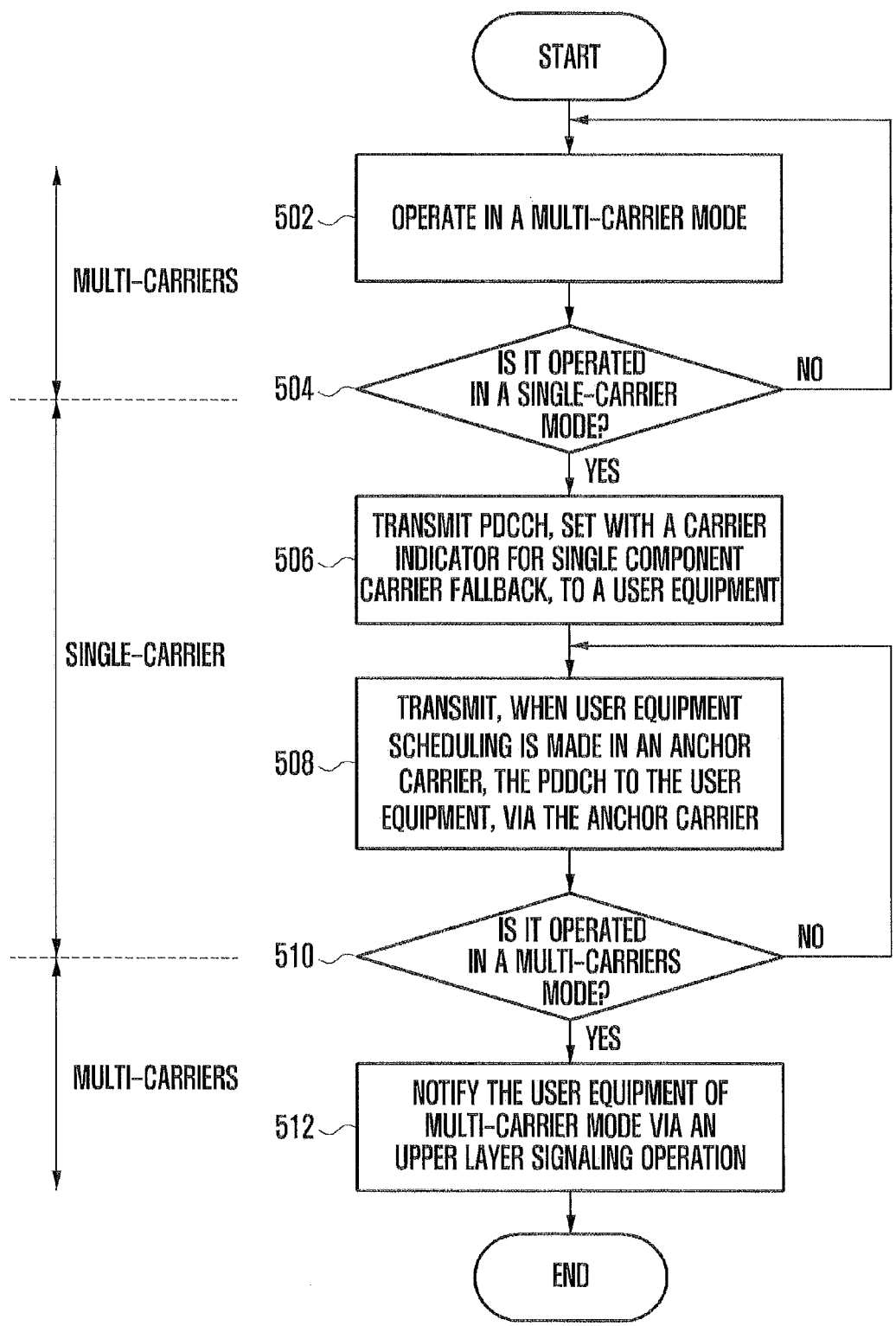
FIG. 5 illustrates a first embodiment of a procedure performed in a base station, according to the invention.

FIG. 5 illustrates a first embodiment of a procedure where a base station allows user equipment to switch the mode from the current multi-carrier mode to a single carrier mode and then to the multi-carrier mode, via the 'single component carrier fallback.'

At step 502, the base station activates multi-carriers with respect to user equipment to be scheduled. When an LTE-A user equipment first accesses a system, the base station determines whether it can support carrier aggregation of the user equipment, and notifies the user equipment of the number of component carriers to be aggregated and the activation state of multi-carriers including the type of component carrier to be aggregated and the determination as to whether a multi-carrier mode is performed.

At step 504, the base station determines whether to allow the user equipment to maintain the activation state of multi-carriers or to deactivate the activation and to switch the current mode to a single carrier mode to receive data, via only a preset anchor carrier. For example, when the base station does not have sufficient data to be transmitted to the user equipment or the available system resources, it instructs the user equipment to perform a single carrier mode. When the base station allows the user equipment to maintain the activation state of multi-carriers at step 504, it returns to and proceeds with step 502.

On the contrary, when the base station allows the user equipment to operate in a single carrier mode at step 504, it sets the carrier indicator for the user equipment as a value preset as a 'single component carrier fallback,' and creates extended DCI by adding DCI for scheduling data transmitted via an anchor carrier, at step 506. The extended DCI is channel-decoded, modulated and interleaved, thereby creating PDCCH. The PDCCH is transmitted to the user equipment via the anchor carrier. The carrier indicator, preset for the 'single component carrier fallback' command, may be set as CI="all one," for example.

At step 508, when the base station intends to schedule data additionally transmitted via an anchor carrier, with respect to the user equipment, it creates extended DCI by aggregating a carrier indicator, set to instruct a 'single component carrier fallback,' with DCI for scheduling data transmitted via an anchor carrier. The extended DCI is channel-decoded, modulated and interleaved, thereby creating PDCCH. The PDCCH is transmitted to the user equipment via the anchor carrier. Once the carrier indicator is set for a 'single component carrier fallback' at step 506, the set state is maintained while the user equipment is operated in a single carrier mode. Therefore, although the user equipment does not receive PDCCH and thus immediately detects the 'single component carrier fallback' at step 506, it has an additional opportunity to successfully acquire the 'single component carrier fallback' at step 508. The base station does not request the feedback from the user equipment if it has received the 'single component carrier fallback,' thereby minimizing the additional signal overhead.

At step 510, the base station determines whether to allow the user equipment to maintain the single carrier mode or to reactivate the multi-carrier mode. If the base station has sufficient data to be transmitted to the user equipment or a sufficient amount of available system resources, it instructs the user equipment to reactivate multi-carriers. When the base station allows the user equipment to maintain the single carrier mode at step 510, it returns to and proceeds with step 508. On the contrary, when the base station allows the user equipment to reactivate the multi-carrier mode at step 510, it notifies the user equipment of the specific activation state for the multi-carrier mode by an upper layer signaling operation at step 512. The notification procedure will be described, in detail, later, referring to FIG. 7.

Figure 6:
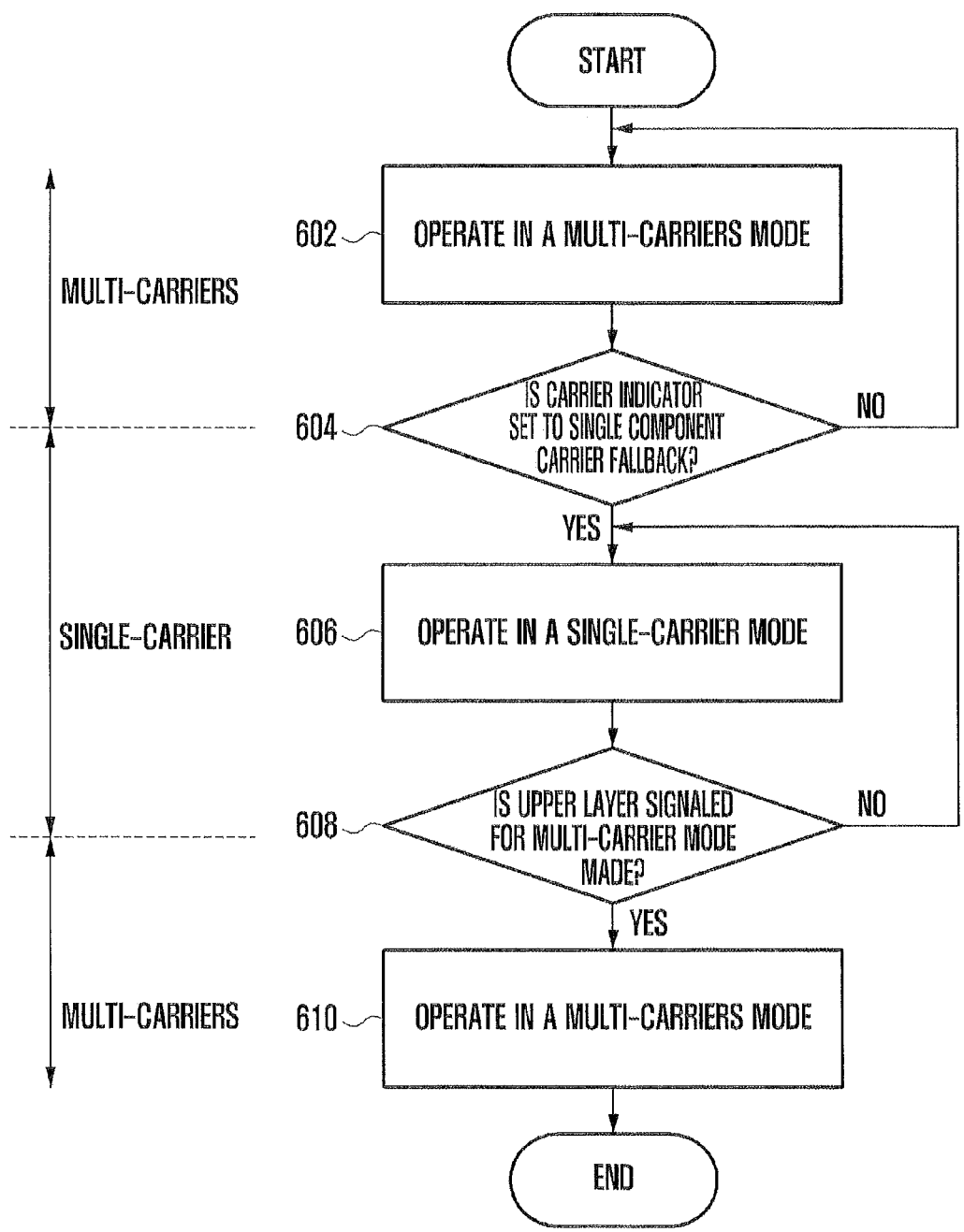
FIG. 6 illustrates a first embodiment of a procedure performed in user equipment, according to the invention.

FIG. 6 illustrates a first embodiment of a procedure where user equipment switches the current multi-carrier mode to a single carrier mode and then to the multi-carrier mode, according to instructions from a base station.

Referring to FIG. 6, the user equipment activates the multi-carriers according to the command from the base station at step 602.

At step 604, the user equipment receives PDCCH from the base station and determines whether the carrier indicator is set to a 'single component carrier fallback.' When the user equipment ascertains that the carrier indicator is not set to a 'single component carrier fallback' at step 604, it returns to and proceeds with step 602.

On the contrary, when the user equipment ascertains that the carrier indicator is set to a 'single component carrier fallback' at step 604, it stops receiving data via the remaining component carriers other than the anchor carrier and operates in a single carrier mode at step 606. In that case, the user equipment does not transmit, to the base station, a feedback whether it has successfully received the 'single component carrier fallback' command; however, it transmits, to the base station, an ACK/NACK feedback indicating whether there is error in data received via PDSCH.

After that, the user equipment determines whether to reactivate multi-carrier mode via an upper layer signaling operation from the base station at step 608. When the user equipment ascertains that a multi-carrier mode is not reactivated at step 608, it returns to and proceeds with step 606.

On the contrary, when the user equipment ascertains that a multi-carrier mode is reactivated at step 608, it operates in a multi-carrier mode according to the command from the base station at step 610. According to the commands for activating a multi-carrier mode from the base station, the user equipment operates in the mode, which will be described, in detail, referring to FIG. 8. In order to allow user equipment to switch the operation mode from the single carrier mode to a multi-carrier mode according to a 'single component carrier fallback,' the base station, described referring to FIGS. 5 and 6, reactivates the multi-carrier mode by an upper layer signaling operation. In addition, the operation can also be achieved by the following methods.

Method 1: When a base station reactivates a multi-carrier mode of user equipment, it configures extended DCI, via DCI serving as scheduling information regarding data transmitted via an anchor carrier, and a carrier indicator indicating component carriers to be activated. The base station creates PDCCH based on the extended DCI, and transmits it to the user equipment, via the anchor carrier and a PHSCH serving as a dedicated channel for scheduled data transmission. The user equipment feed basks the base station an ACK/NACK signal indicating whether to successfully receive the PDSCH, and then operates in a multi-carrier mode. After successfully receiving the PDSCH, the user equipment can decode it. When the base station receives a feedback of ACK/NACK regarding the PDSCH from the user equipment, it can detect that the user equipment has successfully received the PDCCH and thus operates in a multi-carrier mode.

Method 2: When the base station reactivates a multi-carrier mode of user equipment, it configures extended DCI by coupling a carrier indicator, indicating a component carrier to be activated, with a preset pattern. The preset pattern is used as virtual cyclic redundancy check (CRC) and reinforces an error detection ability regarding the extended DCI. That is, the pattern can be used to minimize the possibility that user equipment detects the extended DCI in error and activates multi-carriers, although the base station didn't instruct the user equipment to activate multi-carriers. The extended DCI doesn't include resource allocation information regarding data that the base station will transmit, scheduling information, transmission format, etc. When the user equipment has successfully received the extended DCI via the PDCCH, it transmits ACK to the base station and operates in a multi-carrier mode. On the contrary, when the user equipment fails to receive the extended DCI via the PDCCH, it doesn't feed back and maintains operating in a single carrier mode. Only if the base station receives ACK for the PDCCH from the user equipment, it detects that the user equipment switches the mode to a multi-carrier mode.

Method 3: The base station defines a specific codeword of a carrier indicator, included in extended DCI, as a 'multi-carrier re-activation' command. When user equipment receives a 'multi-carrier re-activation' command, it switches the mode to a multi-carrier setting state immediately before being switched to a single carrier mode. For example, when user equipment has been operated a multi-carrier mode including DL CC #1, DL CC #2, DL CC #3, and DL CC #4, immediately before being switched to a single carrier mode, it can re-operate the multi-carrier mode including DL CC #1, DL CC #2, DL CC #3, and DL CC #4, according to the 'multi-carrier re-activation' command. When the base station creates extended DCI, via DCI regarding data scheduled via an anchor carrier, and transmits the extended DCI and the 'multi-carrier re-activation' command to user equipment via PDCCH, the user equipment feeds back the base station an ACK/NCK regarding PDSCH, accompanied by the PDCCH, thereby informing the base station of the successful reception of the 'multi-carrier re-activation' command. The base station creates extended DCI by coupling the 'multi-carrier re-activation' command with a preset pattern, and transmits it via PDCCH. The extended DCI doesn't include resource allocation information regarding data that the base station will transmit, scheduling information, transmission format, etc. In that case, only if the base station receives ACK for the PDCCH from the user equipment, it detects that the user equipment switches the mode to a multi-carrier mode.

Figure 7:
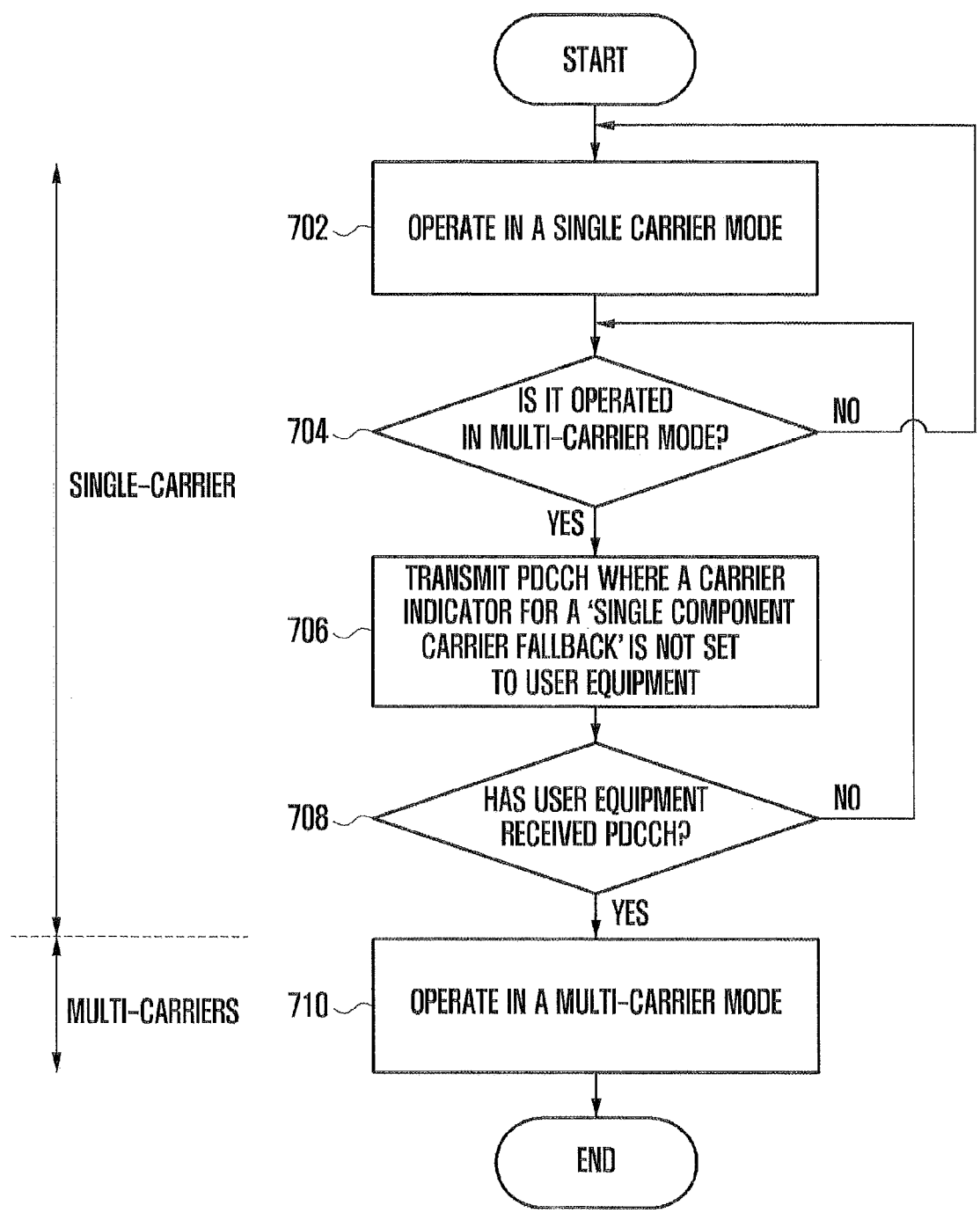
FIG. 7 illustrates a first embodiment of a procedure for reactivating multi-carriers in a base station, according to the invention.

FIG. 7 illustrates a first embodiment of a procedure of Methods 1, 2, and 3, described above, where the base station enables the user equipment to switch the current single carrier mode to a multi-carrier mode, according to a 'single component carrier fallback' command.

At step 702, the current base station allows user equipment to be scheduled to operate in a single carrier mode.

At step 704, the base station determines whether to allow the user equipment to maintain the single carrier mode or to reactivate a multi-carrier mode. For example, if the base station has sufficient data to be transmitted to the user equipment or a sufficient amount of available system resources, it instructs the user equipment to reactivate a multi-carrier mode. When the base station allows the user equipment to maintain the single carrier mode at step 704, it returns to and proceeds with step 702.

On the contrary, when the base station allows the user equipment to reactivate a multi-carrier mode at step 704, it configures extended DCI, via a 'multi-carrier reactivation' command or a carrier indicator that indicates component carriers to be activated, instead of a 'single component carrier fallback' command, and transmits it via PDCCH, at step 706. When the extended DCI includes scheduling information regarding data scheduled via an anchor carrier, the base station additionally transmits the scheduled data via PDSCH.

At step 708, the base station determines whether the user equipment has successfully received the extended DCI. If the base station has transmitted PDSCH and received ACK/NACK regarding the PDSCH from the user equipment at step 706, it detects whether the user equipment has successfully received the extended DCI according to the ACK/NACK. If the base station has not scheduled PDSCH at step 706 but receives ACK regarding PDCCH, through which the extended DCI is transmitted, from the user equipment, it detects that the user equipment has successfully received the extended DCI. When the base station ascertains that the user equipment fails to receive the extended DCI at step 708, it returns to and proceeds with step 704. On the contrary, when the base station ascertains that the user equipment has successfully received the extended DCI at step 708, it executes a multi-carrier mode with respect to the user equipment at step 710.

Figure 8:
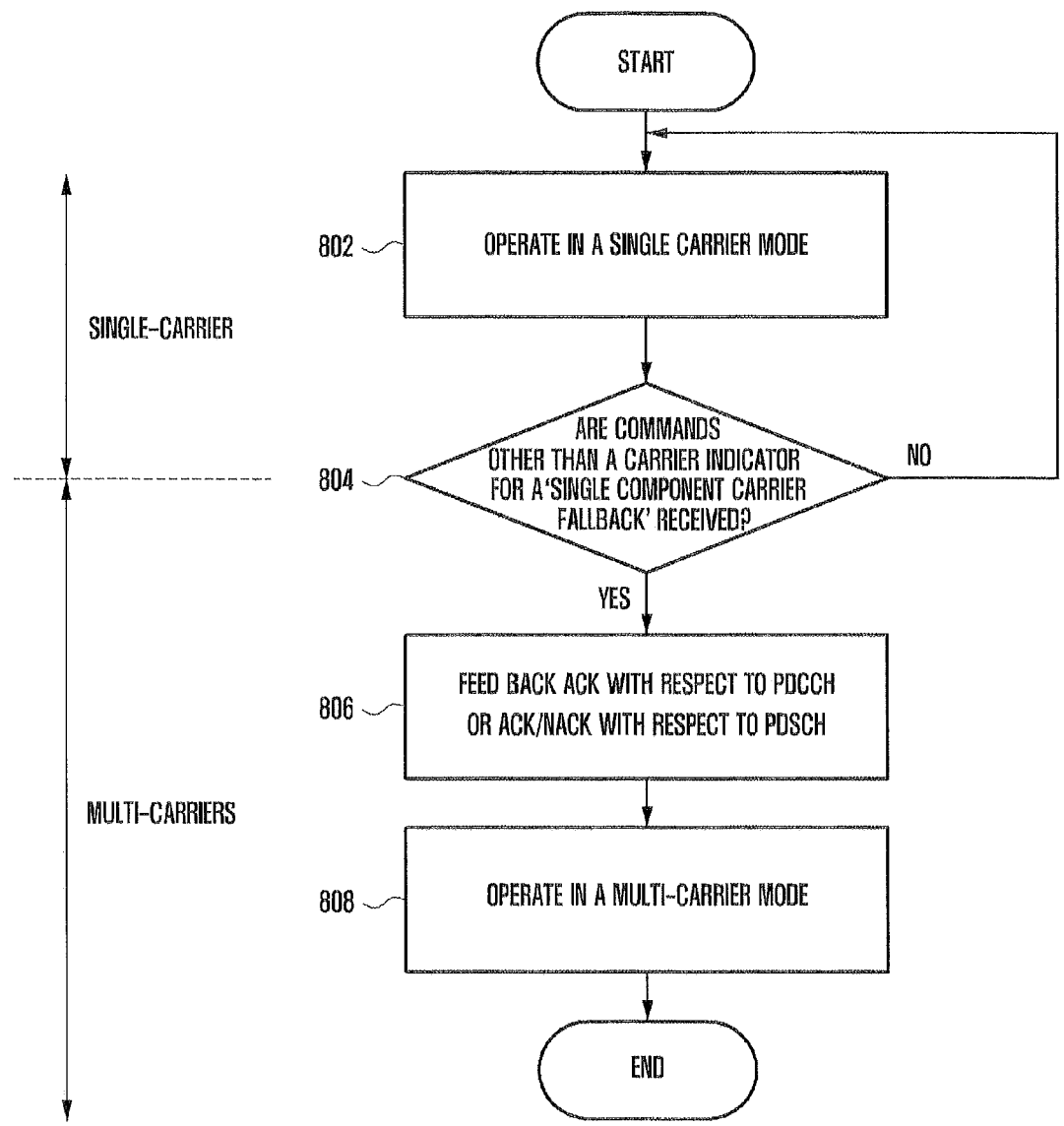
FIG. 8 illustrates a first embodiment of a procedure for reactivating multi-carriers in user equipment, according to the invention.

FIG. 8 illustrates a first embodiment of a procedure of Methods 1, 2, and 3, described above, where the user equipment switches the mode from a single carrier mode to a multi-carrier mode, according to a 'single component carrier fallback' command.

At step 802, the user equipment stops receiving data via the remaining component carriers other than the anchor carrier and operates in a single carrier mode.

At step 804, the user equipment determines whether to receive a carrier indicator that indicates a specific component carrier or a 'multi-carrier reactivation' command, instead of a 'single component carrier fallback' command, from the base station, via PDCCH. When the user equipment has received a 'single component carrier fallback' command or fails to receive data via PDCCH at step 804, it returns to and proceeds with step 802.

On the contrary, when the user equipment has received a carrier indicator or a 'multi-carrier reactivation' command at step 804, it identifies whether the received PDCCH data includes scheduling information regarding data at step 806. When the user equipment ascertains that the received PDCCH data includes scheduling information, it feeds back the base station an ACK or NACK signal indicating whether the data has been successfully received via PDSCH or not. On the contrary, when the user equipment ascertains that the received PDCCH data doesn't include scheduling information, it feeds back the base station an ACK.

As step 808, when the user equipment activates a component carrier, indicated by a carrier indicator received via the PDCCH, or a 'multi-carrier reactivation' command via the PDCCH, it switches the mode to a multi-carrier state immediately before executing a 'single component carrier fallback.'

Embodiment 2

In embodiment 2, user equipment where multi-carriers are activated performs the deactivation and performs a single carrier mode, in an LTE-A system supporting carrier aggregation. User equipment transmits downlink control information: via extended DCI including carrier indicators (CIs), in a multi-carrier mode; and via usual DCI that does not include CIs, in a single carrier mode. Unlike embodiment 1, embodiment 2 has a feature that requires, the user equipment, a feedback indicating whether the user equipment has successfully received a 'single component carrier fallback.'

Figure 9:
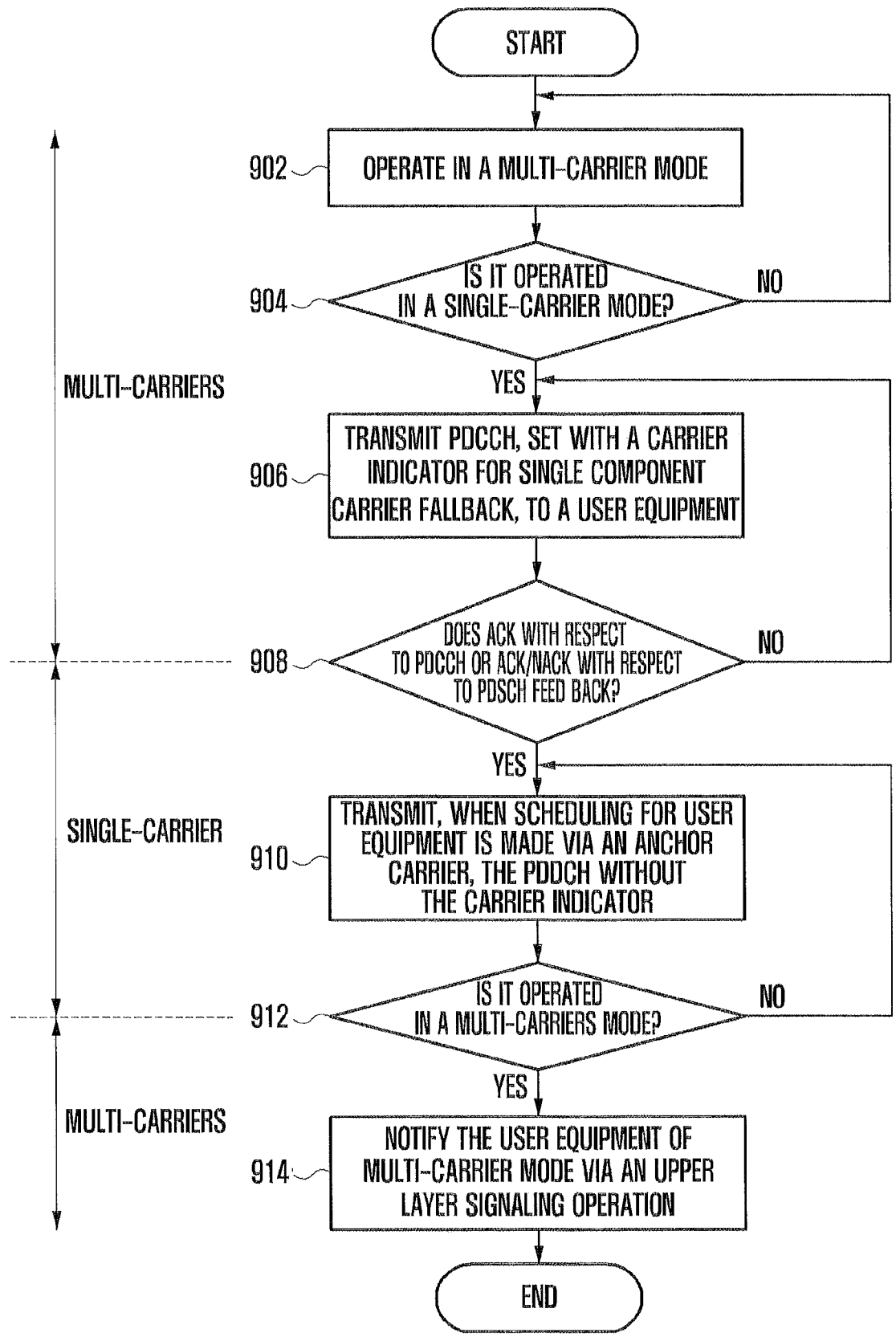
FIG. 9 illustrates a first embodiment of a procedure performed in a base station, according to the invention.

FIG. 9 illustrates a second embodiment of a procedure where a base station allows user equipment to switch the mode from the current multi-carrier mode to a single carrier mode and then to the multi-carrier mode, via the 'single component carrier fallback.'

At step 902, the base station activates multi-carriers with respect to user equipment to be scheduled. When an LTE-A user equipment first accesses a system, the base station determines whether it can support carrier aggregation of the user equipment, and notifies the user equipment of the number of component carriers to be aggregated and the activation state of multi-carriers including the type of component carrier to be aggregated and the determination as to whether a multi-carrier mode is performed.

At step 904, the base station determines whether to allow the user equipment to maintain the activation state of multi-carriers or to deactivate the activation and to switch the current mode to a single carrier mode to receive data via only a preset anchor carrier. For example, when the base station does not have sufficient data to be transmitted to the user equipment or the available system resources, it instructs the user equipment to perform a single carrier mode. When the base station allows the user equipment to maintain the activation state of multi-carriers at step 904, it returns to and proceeds with step 902.

On the contrary, when the base station allows the user equipment to operate in a single carrier mode at step 904, it sets the carrier indicator for the user equipment as a value preset as a 'single component carrier fallback,' and creates extended DCI at step 906. The extended DCI is channel-decoded, modulated and interleaved, thereby creating PDCCH. The PDCCH is transmitted to the user equipment via the anchor carrier. The carrier indicator, preset for the 'single component carrier fallback' command, may be set as CI="all one," for example. The extended DCI includes DCI, serving as scheduling information regarding data scheduled via an anchor carrier, or a preset pattern instead of scheduling information regarding data. If the extended DCI includes DCI serving as scheduling information regarding data scheduled via an anchor carrier, the base station additionally transmits the scheduled data via PDSCH. The preset pattern is used as virtual cyclic redundancy check (CRC) and reinforces an error detection ability regarding the extended DCI. That is, the pattern can be used to minimize the possibility that user equipment detects the extended DCI in error and operates in a single carrier mode, although the base station didn't instruct the user equipment to execute a 'single component carrier fallback' command.

At step 908, the base station determines whether the user equipment has successfully received extended DCI including the 'single component carrier fallback' command. If the base station has transmitted PDSCH and received ACK/NACK regarding the PDSCH from the user equipment at step 906, it detects whether the user equipment has successfully received the extended DCI according to the ACK/NACK. If the base station has not scheduled PDSCH at step 906 but receives ACK regarding PDCCH, through which the extended DCI is transmitted, from the user equipment, it detects that the user equipment has successfully received the extended DCI. When the base station ascertains that the user equipment fails to receive the extended DCI at step 908, it returns to and proceeds with step 906. On the contrary, when the base station ascertains that the user equipment has successfully received the extended DCI at step 908, it executes a single carrier mode with respect to the user equipment at step 910.

At step 910, when the base station intends to schedule data additionally transmitted via an anchor carrier, with respect to the user equipment, it creates downlink control information by only DCI for scheduling data transmitted via the anchor carrier without a carrier indicator. The created downlink control information is channel-coded, modulated, and interleaved, thereby creating PDCCH. The PDCCH is transmitted to the user equipment via the anchor carrier.

At step 912, the base station determines whether to allow the user equipment to maintain the single carrier mode or to reactivate the multi-carrier mode. If the base station has sufficient data to be transmitted to the user equipment or a sufficient amount of available system resources, it instructs the user equipment to reactivate multi-carriers. When the base station allows the user equipment to maintain the single carrier mode at step 912, it returns to and proceeds with step 910.

On the contrary, when the base station allows the user equipment to reactivate the multi-carrier mode at step 912, it notifies the user equipment of the specific activation state for the multi-carrier mode by an upper layer signaling operation at step 914. The notification procedure will be described, in detail, later, referring to FIG. 11.

Figure 10:
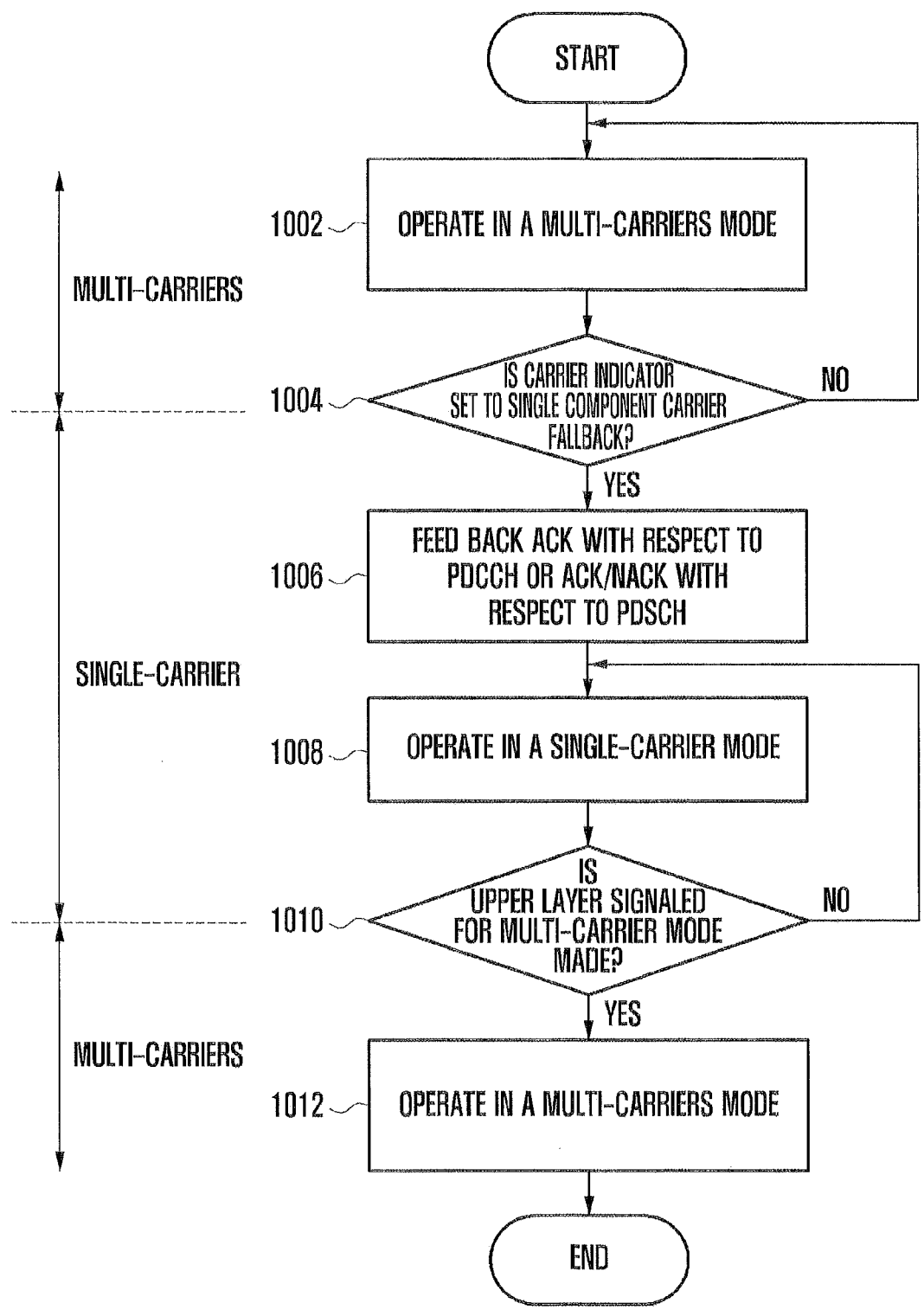
FIG. 10 illustrates a first embodiment of a procedure performed in user equipment, according to the invention.

FIG. 10 illustrates a second embodiment of a procedure where user equipment switches the current multi-carrier mode to a single carrier mode and then to the multi-carrier mode, according to instructions from a base station.

Referring to FIG. 10, the user equipment activates the multi-carriers according to the command from the base station at step 1002.

At step 1004, the user equipment receives PDCCH from the base station and determines whether the carrier indicator is set to a 'single component carrier fallback.' When the user equipment ascertains that the carrier indicator is not set to a 'single component carrier fallback' at step 1004, it returns to and proceeds with step 1002.

On the contrary, when the user equipment ascertains that the carrier indicator is set to a 'single component carrier fallback' at step 1004, it identifies whether the received PDCCH data includes scheduling information regarding data at step 1006. When the user equipment ascertains that the received PDCCH data includes scheduling information, it feeds back the base station an ACK or NACK signal indicating whether the data has been successfully received via PDSCH or not. On the contrary, when the user equipment ascertains that the received PDCCH data doesn't include scheduling information, it feeds back the base station an ACK.

At step 1008, the user equipment stops receiving data via the remaining component carriers other than the anchor carrier and operates in a single carrier mode.

After that, the user equipment determines whether to reactivate multi-carrier mode via an upper layer signaling operation from the base station at step 1010. When the user equipment ascertains that a multi-carrier mode is not reactivated at step 1010, it returns to and proceeds with step 1008.

On the contrary, when the user equipment ascertains that a multi-carrier mode is reactivated at step 1010, it operates in a multi-carrier mode according to the command from the base station at step 1012. According to the commands for activating a multi-carrier mode from the base station, the user equipment operates in the mode, which will be described, in detail, referring to FIG. 12.

In order to allow user equipment to switch the operation mode from the single carrier mode to a multi-carrier mode according to a 'single component carrier fallback,' the base station, described referring to FIGS. 9 and 10, reactivates the multi-carrier mode by an upper layer signaling operation. In addition, the operations can also be achieved by the following embodiments described in FIGS. 11 and 12.

Figure 11:
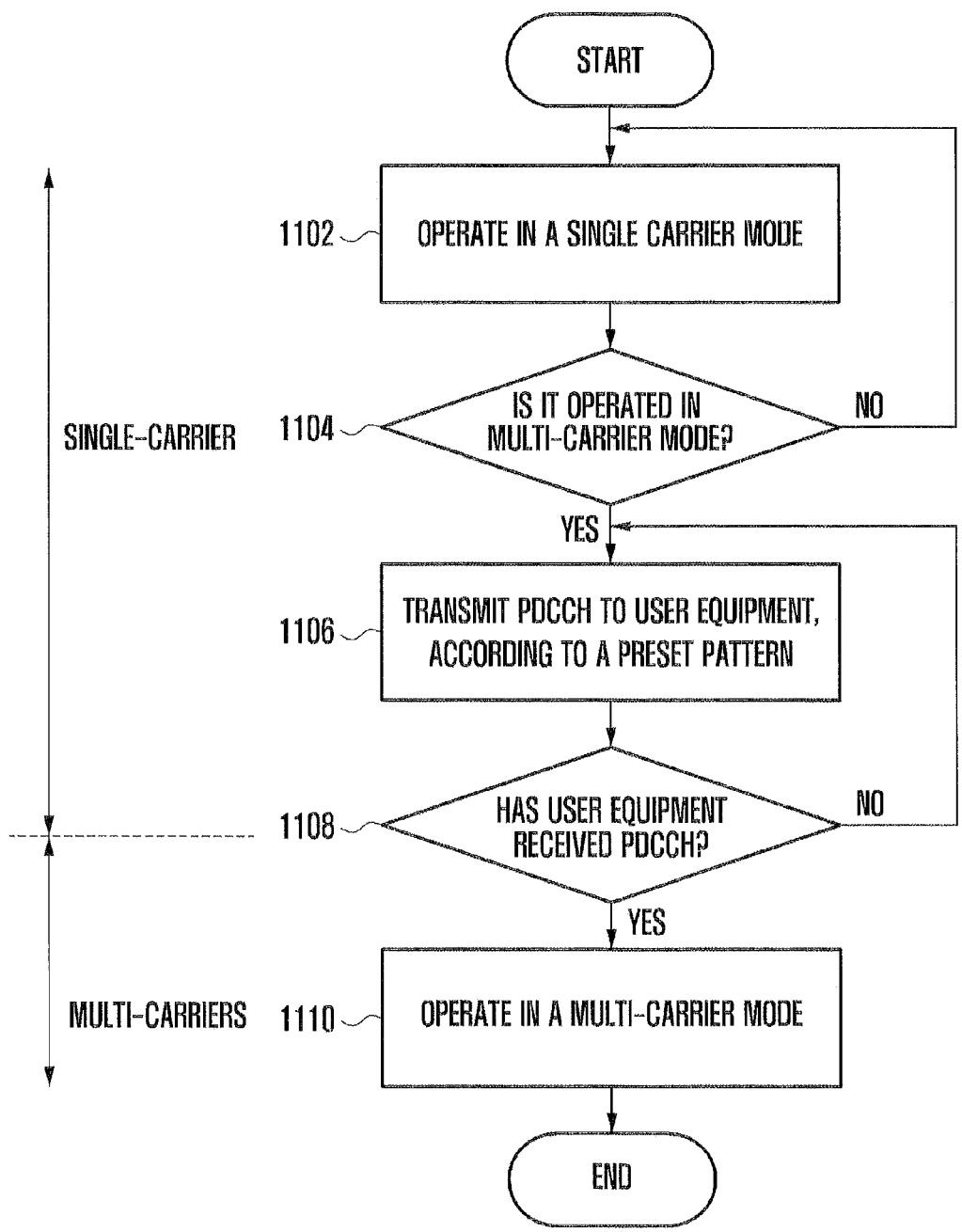
FIG. 11 illustrates a first embodiment of a procedure for reactivating multi-carriers in a base station, according to the invention.

FIG. 11 illustrates a second embodiment of a procedure where the base station enables the user equipment to switch the current single carrier mode to a multi-carrier mode, according to a 'single component carrier fallback' command.

At step 1102, the current base station allows user equipment to be scheduled to operate in a single carrier mode.

At step 1104, the base station determines whether to allow the user equipment to maintain the single carrier mode or to reactivate a multi-carrier mode. For example, if the base station has sufficient data to be transmitted to the user equipment or a sufficient amount of available system resources, it instructs the user equipment to reactivate a multi-carrier mode. When the base station allows the user equipment to maintain the single carrier mode at step 1104, it returns to and proceeds with step 1102.

On the contrary, when the base station allows the user equipment to reactivate a multi-carrier mode at step 1104, it must use usual DCI without a carrier indicator, as downlink control information, during the single carrier mode at 1106. In that case, the base station instructs the user equipment to return to the multi-carrier mode, by fixing part of the DCI to a preset pattern or all of the DCI to a preset pattern to reinforce the error detection. If part of the DCI is fixed to a preset pattern, the base station informs the user equipment of scheduling information regarding data scheduled via an anchor carrier, via the remaining DCI areas, and then transmits the scheduled data via PDSCH. If all of the DCI is fixed to a preset pattern, the base station doesn't schedule data.

At step 1108, the base station determines whether the user equipment has successfully received the DCI. If the base station has transmitted PDSCH and received ACK/NACK regarding the PDSCH from the user equipment at step 1106, it detects whether the user equipment has successfully received the DCI according to the ACK/NACK. If the base station has not scheduled PDSCH at step 1106 but receives ACK regarding PDCCH, through which the DCI is transmitted, from the user equipment, it detects that the user equipment has successfully received the DCI. When the base station ascertains that the user equipment fails to receive the DCI at step 1108, it returns to and proceeds with step 1106. On the contrary, when the base station ascertains that the user equipment has successfully received the DCI at step 1108, it executes a multi-carrier mode with respect to the user equipment at step 1110. In that case, the user equipment switches the mode to a multi-carrier setting state immediately before being switched to a single carrier mode. For example, when the user equipment has been operated a multi-carrier mode including DL CC #1, DL CC #2, DL CC #3, and DL CC #4, immediately before being switched to a single carrier mode, it can re-operate the multi-carrier mode including DL CC #1, DL CC #2, DL CC #3, and DL CC #4, at step 1110.

Figure 12:
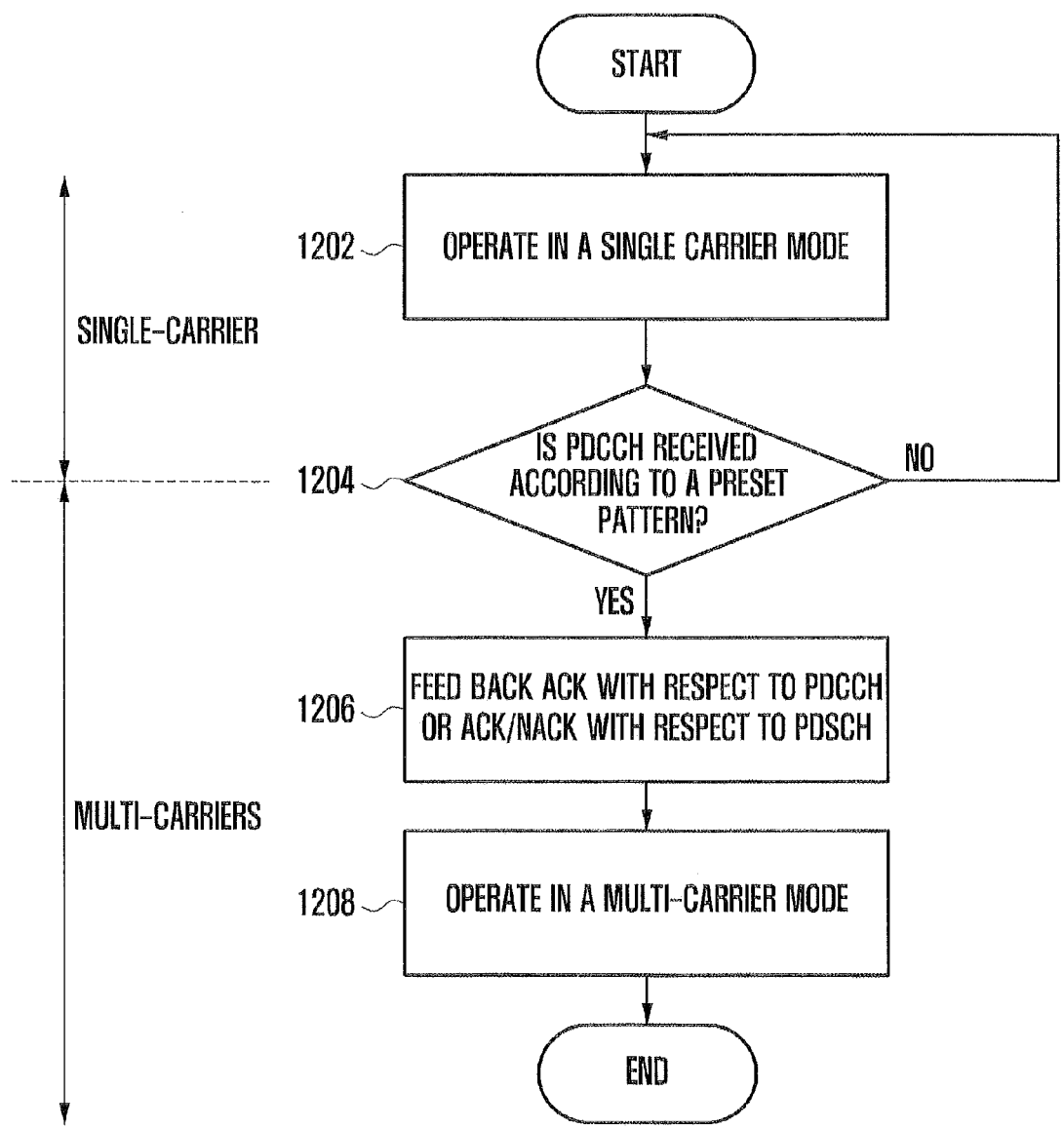
FIG. 12 illustrates a first embodiment of a procedure for reactivating multi-carriers in user equipment, according to the invention.

FIG. 12 illustrates a second embodiment of a procedure where the user equipment switches the mode from a single carrier mode to a multi-carrier mode, according to a 'single component carrier fallback' command.

At step 1202, the user equipment stops receiving data via the remaining component carriers other than the anchor carrier and operates in a single carrier mode.

At step 1204, the user equipment detects DCI from PDCCH transmitted from the base station. If the user equipment ascertains that the DCI is not set to a preset pattern to notify the base station of the switching operation to a multi-carrier mode, it returns to and proceeds with step 1202.

On the contrary, if the user equipment ascertains that par or all of the DCI is set to a preset pattern to notify the base station of the switching instruction to a multi-carrier mode, it detects that it must return to a multi-carrier mode at step 1206. That is, the user equipment identifies whether the received PDCCH data includes scheduling information regarding data at step 1206. When the user equipment ascertains that the received PDCCH data includes scheduling information, it feeds back the base station an ACK or NACK signal indicating whether the data has been successfully received via PDSCH or not. On the contrary, when the user equipment ascertains that the received PDCCH data doesn't include scheduling information, it feeds back the base station an ACK.

As step 1208, the user equipment witches the mode to a multi-carrier state immediately before executing a 'single component carrier fallback.'

Figure 13:
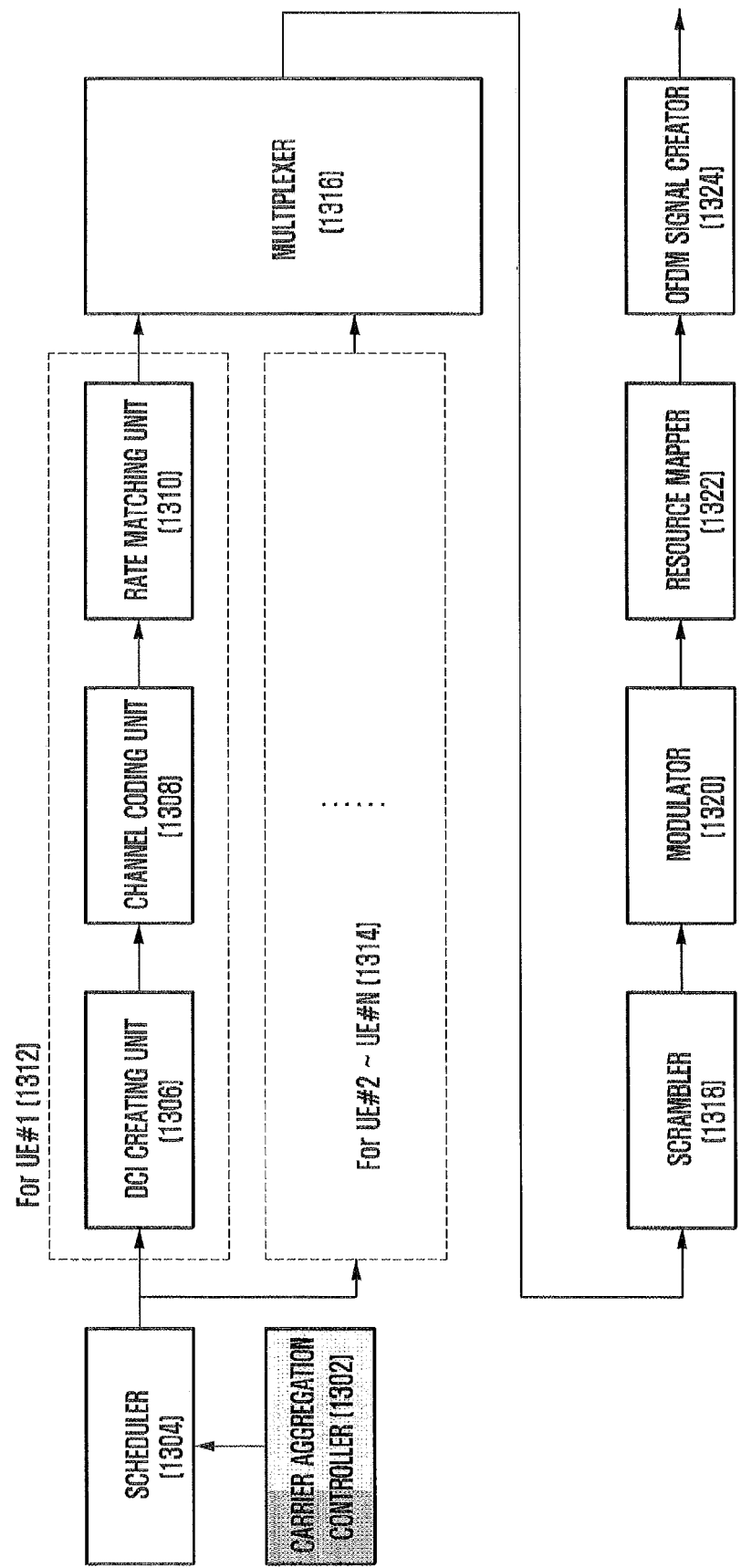
FIG. 13 illustrates a configuration of a base station according to the invention.

FIG. 13 illustrates a configuration of a base station according to the invention.

Referring to FIG. 13, the base station includes a carrier aggregation controller 1302, a scheduler 1304, a number of DCI processors 1312 and 1314, a multiplexer 1316, a scrambler 1318, a modulator 1320, a resource mapper 1322, and an OFDM signal creator 1324. A DCI processor 1312, one of a number of DCI processors 1312 and 1314, is related to user equipment, UE #1, and includes a DCI creating unit 1306, a channel coding unit 1308, and a rate matching unit 1310. The other DCI processors 1314, related to UE #2 to UE #N, have the same components as DCI processor 1312 for UE #1.

The carrier aggregation controller 1302 determines the carrier aggregation with respect to user equipment to be scheduled, referring to amount of data to be transmitted to user equipment and the amount of available system resources, and informs the scheduler 1304 of the determination. If the carrier aggregation controller 1302 intends to notify UE #1 operating in a multi-carrier mode of the determination of a 'single component carrier fallback,' the scheduler 1304 controls the DCI creating unit 1306 to configure extended DCI by setting a carrier indicator to a preset codeword for a 'single component carrier fallback.' The extended DCI is equipped with an error correction ability by the channel coding unit 1308, rate-matched by the rate matching unit 1310 with the amount of mapped resources to be mapped, and multiplexed with DCI of the other user equipment by the multiplexer 1316. The multiplexed signal is processed via the scrambler 1318 and the modulator 1320 and mapped to time-frequency resources to be transmitted by the resource mapper 1322. The OFDM signal creator 1324 creates an OFDM signal from the mapped signal and transmits it to the user equipment.

Figure 14:
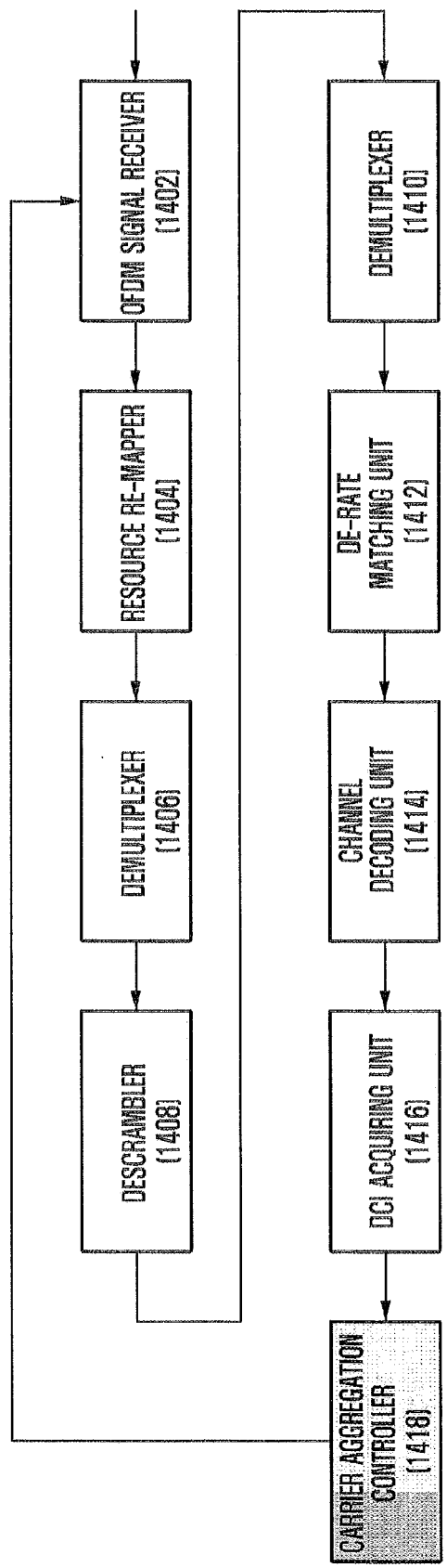
FIG. 14 illustrates a configuration of user equipment according to the invention.

FIG. 14 illustrates a configuration of user equipment according to the invention.

Referring to FIG. 14, the user equipment includes an OFDM signal receiver 1402, a resource re-mapper 1404, a demultiplexer 1406, a descrambler 1408, a demultiplexer 1410, a de-rate matching unit 1412, a channel decoding unit 1414, a DCI acquiring unit 1416, and a carrier aggregation controller 1418.

The OFDM signal receiver 1402 receives signal from the base station. The resource re-mapper 1404 extracts PDCCH from the signals received by the OFDM signal receiver 1402. The demultiplexer 1406 and the descrambler 1408 process the PDCCH. The demultiplexer 1410 extracts corresponding allocated PDCCH from the processed PDCCH from the descrambler 1408. The de-rate-matching unit 1412 re-rate-matches the PDCCH extracted by the user equipment. The channel decoding unit 1414 decodes the re-rate-matched PDCCH. The DCI acquiring unit 1416 extracts DCI from the decoded result. The DCI is output to the carrier aggregation controller 1418 and used to control the carrier aggregation state of the user equipment. If the DCI indicates a 'single component carrier fallback,' the carrier aggregation controller 1418 controls the OFDM signal receiver 1402 to receive data via only an anchor carrier, thereby reducing electric power consumption.

Although the embodiments were described where downlink component carriers are aggregated, it should be understood that the invention can also applied to the aggregation of uplink component carriers.

The embodiment where the base station instructs user equipment to operate according to the 'single component carrier fallback' may be modified in such a way that the base station can define part or all of the extended DCI to be transmitted to a preset pattern and deactivates a specific component carrier indicated by a carrier indicator.

As described above, the system and method according to the invention can allow user equipment to rapidly deactivate the carrier aggregation in a wireless communication system that supports a wide range of bandwidth via carrier aggregation, thereby reducing electric power consumption in the user equipment.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A transmission method of a base station in a mobile communication system supporting carrier aggregation, comprising:
    activating a plurality of component carriers to be aggregated if a user equipment is in a multi-carrier mode;
    transmitting a first control signal and data using the plurality of component carriers to be activated if the user equipment is in the multi-carrier mode;
    deactivating the plurality of component carriers with one of the plurality of component carriers remaining activated if the multi-carrier mode is switched to a single carrier mode;
    transmitting a second control signal comprising an indicator indicating to switch the multi-carrier mode to the single carrier mode and data using the one of the plurality of component carriers remaining activated;
    activating the plurality of component carriers to be aggregated if the single-carrier mode is switched to the multi-carrier mode; and
    notifying, if the single carrier mode is switched to the multi-carrier mode, user equipment of switching to the multi-carrier mode.

2. The method of claim 1, wherein the one of the plurality of component carriers remaining activated comprises an anchor carrier, and
    wherein the second control signal indicating to switch the multi-carrier mode to the single-carrier mode is transmitted using the anchor carrier repeatedly.

3. The method of claim 1, further comprising:
    determining whether the user equipment receives the second control signal comprising the indicator indicating to switch the multi-carrier mode to the single carrier mode using a response signal received from the user equipment; and
    transmitting the second control signal, if the second control signal is not received by the user equipment.

4. The method of claim 1, wherein the notification of switching to the multi-carrier mode is performed by an upper layer signaling operation.

5. The method of claim 1, wherein notifying of the multi-carrier mode comprises:
    transmitting a third control signal comprising an indicator indicating to switch the single-carrier mode to the multi-carrier mode.

6. The method of claim 1, further comprising:
    determining whether to switch a current mode which is one of the multi-carrier mode and the single-carrier mode based on an amount of data to be transmitted and available system resources.

7. A reception method of user equipment in a mobile communication system supporting carrier aggregation, comprising:
    receiving, if the use equipment is in a multi-carrier mode, data and a first control signal using the plurality of component carriers to be activated; and
    switching the multi-carrier mode to a single carrier mode in response to a second control signal, if the second control signal comprising an indicator indicating to switch the multi-carrier mode to the single carrier mode is received using the one of the plurality of component carriers remaining activated.

8. The method of claim 7, further comprising:
    deactivating the plurality of component carriers with one of the plurality of carriers remaining activated if the multi-carrier mode is switched to a single carrier mode.

9. The method of claim 7, further comprising:
    transmitting, to a base station, a signal indicating whether the user equipment receives the second control signal or not in response to the data or the second control signal comprising the indicator indicating to switch the multi-carrier mode to the single carrier mode; and
    receiving the second control signal comprising the indicator indicating to switch the multi-carrier mode to the single carrier mode if the second control signal is not received by the user equipment.

10. The method of claim 7, further comprising:
    switching the single-carrier mode to the multi-carrier mode in response to a notification of the multi-carrier mode which is performed by an upper layer signaling operation.

11. The method of claim 7, further comprising:
    receiving a third control signal comprising an indicator indicating to switch the single-carrier mode to the multi-carrier mode;
    transmitting a signal in response to the third control signal; and
    switching the single-carrier mode to the multi-carrier mode in response to the third control signal.

12. A transmission device of a base station in a mobile communication system supporting carrier aggregation, the device comprising:
    a controller configured to activate a plurality of component carriers to be aggregated if a user equipment is in a multi-carrier mode, deactivate the plurality of component carriers with one of the plurality of carriers remaining activated if the multi-carrier mode is switched to a single carrier mode, and activate the plurality of component carriers to be aggregated if the single-carrier mode is switched to the multi-carrier mode; and
    a scheduler configured to transmit a first control signal and data using the plurality of component carriers to be activated if the user equipment is in the multi-carrier mode, transmit a second control signal comprising an indicator indicating to switch the multi-carrier mode to the single carrier mode and data using the one of the plurality of component carriers remaining activated, and notify, if the single carrier mode is switched to the multi-carrier mode, user equipment of the multi-carrier mode.

13. The device of claim 12, wherein the controller is further configured to determine whether the user equipment receives the second control signal comprising the indicator indicating to switch the multi-carrier mode to the single carrier mode using a response signal received from the user equipment; and
wherein the scheduler is further configured to transmit the second control signal indicating to switch the multi-carrier mode to the single carrier mode if the second control signal is not received by the user equipment.

14. The device of claim 12, wherein the scheduler is further configured to notify the user equipment of execution of the multi-carrier mode by signaling an upper layer.

15. The device of claim 12, wherein the one of the plurality of component carriers remaining activated comprises an anchor carrier, wherein the second control signal indicating to switch the multi-carrier mode to the single-carrier mode is transmitted using the anchor carrier repeatedly.

16. The device of claim 12, wherein the scheduler is further configured to notify the user equipment of switching to the multi-carrier mode by transmitting a third control signal comprising an indicator indicating to switch the single-carrier mode to the multi-carrier mode.

17. The device of claim 12, wherein the controller is further configured to determine whether to switch a current mode which is one of the multi-carrier mode and the single-carrier mode based on an amount of data to be transmitted and available system resources.

18. A reception device of user equipment in a mobile communication system supporting carrier aggregation, the device comprising:
a receiver configured to receive data and a control signal using the plurality of component carriers to be activated if the user equipment is in a multi-carrier mode, and data and a control signal using one of the plurality of component carriers remaining activated if the user equipment is in a single carrier mode; and
a carrier aggregation controller configured to switch, if a first control signal comprising an indicator indicating to switch the multi-carrier mode to the single carrier mode is received using the one of the plurality of component carriers remaining activated, the multi-carrier mode to a single carrier mode, and switch the single-carrier mode to the multi-carrier mode in response to a notification of switching to the multi-carriers mode.

19. The device of claim 18, wherein the controller is further configured to transmit a signal indicating whether the user equipment receives the second control signal or not, in response to the second control signal comprising the indicator indicating to switch the multi-carrier mode to the single carrier mode.

20. The device of claim 18, wherein the controller is further configured to deactivate the plurality of component carriers with one of the plurality of component carriers remaining activated, if the multi-carrier mode is switched to a single carrier mode.

21. The device of claim 18, wherein the notification of switching to the multi-carrier mode is performed by an upper layer signaling operation.

22. The device of claim 18, wherein the receiver is further configured to receive a third control signal comprising an indicator indicating to switch the single-carrier mode to the multi-carrier mode; and
wherein the controller is further configured to transmit a signal in response to the third control signal, and switch the single-carrier mode to the multi-carrier mode in response to the third control signal.

* * * * *